United States Patent
Rander et al.

(10) Patent No.: US 11,067,991 B2
(45) Date of Patent: Jul. 20, 2021

(54) FACILITATING RIDER PICK-UP FOR A SELF-DRIVING VEHICLE

(71) Applicant: Uber Technologies, Inc., San Francisco, CA (US)

(72) Inventors: Peter Rander, Mars, PA (US); Anthony Stentz, Pittsburgh, PA (US); Brett Browning, Pittsburgh, PA (US); Bryan Nagy, Pittsburgh, PA (US)

(73) Assignee: Uber Technologies, Inc., San Francisco, CA (US)

( * ) Notice: Subject to any disclaimer, the term of this patent is extended or adjusted under 35 U.S.C. 154(b) by 62 days.

(21) Appl. No.: 16/420,654

(22) Filed: May 23, 2019

(65) Prior Publication Data

US 2019/0361447 A1 Nov. 28, 2019

Related U.S. Application Data

(63) Continuation of application No. 15/606,451, filed on May 26, 2017, now Pat. No. 10,303,173.

(Continued)

(51) Int. Cl.
*G05D 1/02* (2020.01)
*B60W 30/00* (2006.01)
(Continued)

(52) U.S. Cl.
CPC ........... *G05D 1/0212* (2013.01); *B60W 30/00* (2013.01); *G01C 21/3438* (2013.01);
(Continued)

(58) Field of Classification Search
None
See application file for complete search history.

(56) References Cited

U.S. PATENT DOCUMENTS 6,381,535 B1 4/2002 Durocher
6,542,111 B1 4/2003 Wilson
(Continued)

FOREIGN PATENT DOCUMENTS

CN 102859323 A 2/2013
CN 105575104 5/2016
(Continued)

OTHER PUBLICATIONS

Extended European Search Report for EP 17803718.0, dated Nov. 12, 2019, 11 pages.

(Continued)

*Primary Examiner* — Bhavesh V Amin
(74) *Attorney, Agent, or Firm* — Dority & Manning, P.A.

(57) ABSTRACT

A control system of a self-driving vehicle (SDV) can process sensor data from the sensor system to autonomously operate acceleration, braking, and steering systems of the SDV throughout a given region. The control system can receive a transport directive from a transport facilitation system to service a pick-up request from a requesting user, the transport directive indicating an inputted pick-up location by the requesting user. The control system can then autonomously operate the acceleration, braking, and steering systems along a current route to a pick-up area encompassing the inputted pick-up location. The control system can further determine a corresponding set of pick-up location options for the pick-up area, and as the SDV approaches the pick-up area, perform a hierarchical operation to identify, via the sensor data, an optimal pick-up location to rendezvous with the requesting user.

20 Claims, 5 Drawing Sheets

Related U.S. Application Data (60) Provisional application No. 62/342,797, filed on May 27, 2016.

(51) Int. Cl.

| | | |
|---|---|---|
| *G06Q 50/28* | (2012.01) | |
| *G06Q 10/06* | (2012.01) | |
| *G01C 21/34* | (2006.01) | |
| *G05D 1/00* | (2006.01) | |
| *H04W 8/00* | (2009.01) | |

(52) U.S. Cl.
CPC ....... *G01C 21/3453* (2013.01); *G05D 1/0022* (2013.01); *G05D 1/0217* (2013.01); *G06Q 10/06311* (2013.01); *G06Q 50/28* (2013.01); *H04W 8/005* (2013.01); *G05D 2201/0213* (2013.01)

(56) References Cited

U.S. PATENT DOCUMENTS

| | | |
|---|---|---|
| 6,795,031 B1 | 9/2004 | Walker |
| 8,457,827 B1 | 6/2013 | Ferguson |
| 8,630,897 B1 | 1/2014 | Prada Gomez |
| 8,676,430 B1 | 3/2014 | Ferguson et al. |
| 8,825,265 B1 | 9/2014 | Ferguson |
| 8,874,301 B1 | 10/2014 | Rao |
| 9,194,168 B1 * | 11/2015 | Lu .................. B60R 25/24 |
| 9,317,033 B2 | 4/2016 | Ibanez-Guzman |
| 9,384,402 B1 | 7/2016 | Furman |
| 9,436,182 B2 | 9/2016 | Nemec |
| 9,465,388 B1 | 10/2016 | Fairfield |
| 9,494,439 B1 | 11/2016 | Ross |
| 9,506,763 B2 | 11/2016 | Averbunch |
| 9,547,307 B1 | 1/2017 | Cullinane |
| 9,547,985 B2 | 1/2017 | Tuukkanen |
| 9,552,564 B1 | 1/2017 | Martenis |
| 9,953,283 B2 | 4/2018 | Sweeney |
| 10,012,995 B2 | 7/2018 | Kojo |
| 10,217,069 B2 * | 2/2019 | Scicluna ............. G06Q 50/30 |
| 10,671,961 B2 * | 6/2020 | Cao ..................... G06Q 50/30 |
| 2002/0026281 A1 | 2/2002 | Shibata |
| 2003/0040944 A1 * | 2/2003 | Hileman ............. G06Q 10/08 705/5 |
| 2007/0032225 A1 | 2/2007 | Konicek |
| 2008/0027590 A1 | 1/2008 | Phillips |
| 2008/0059007 A1 | 3/2008 | Whittaker et al. |
| 2008/0086241 A1 | 4/2008 | Phillips |
| 2008/0195428 A1 * | 8/2008 | O'Sullivan ........... G06Q 10/02 705/6 |
| 2008/0215202 A1 | 9/2008 | Breed |
| 2009/0140887 A1 | 6/2009 | Breed |
| 2009/0248231 A1 | 10/2009 | Kamiya |
| 2010/0049528 A1 | 2/2010 | Zeinstra |
| 2010/0082195 A1 | 4/2010 | Lee |
| 2010/0201829 A1 | 8/2010 | Skoskiewicz |
| 2010/0256836 A1 | 10/2010 | Mudalige |
| 2011/0125395 A1 | 5/2011 | Mathews |
| 2011/0144828 A1 | 6/2011 | Chengalva |
| 2011/0288695 A1 | 11/2011 | Gariepy |
| 2012/0041675 A1 * | 2/2012 | Juliver ............... G06Q 30/0283 701/465 |
| 2012/0065762 A1 | 3/2012 | Pillarisetti |
| 2012/0101660 A1 | 4/2012 | Hattori |
| 2013/0073327 A1 * | 3/2013 | Edelberg ............ G06Q 10/047 705/7.13 |
| 2013/0082820 A1 | 4/2013 | Tieman |
| 2013/0085817 A1 | 4/2013 | Pinkus |
| 2013/0090802 A1 | 4/2013 | Curtis |
| 2013/0099892 A1 | 4/2013 | Tucker |
| 2013/0158795 A1 | 6/2013 | Hahne |
| 2013/0190964 A1 | 7/2013 | Uehara |
| 2013/0246207 A1 | 9/2013 | Novak |
| 2013/0267194 A1 | 10/2013 | Breed |
| 2014/0028440 A1 | 1/2014 | Takeuchi |
| 2014/0067488 A1 | 3/2014 | James |
| 2014/0121964 A1 | 5/2014 | Stanley |
| 2014/0129302 A1 | 5/2014 | Amin |
| 2014/0172727 A1 | 6/2014 | Abhyanker |
| 2014/0188920 A1 | 7/2014 | Sharma |
| 2014/0365258 A1 | 12/2014 | Vestal |
| 2015/0006005 A1 | 1/2015 | Yu |
| 2015/0100189 A1 | 4/2015 | Tellis |
| 2015/0104071 A1 | 4/2015 | Martin |
| 2015/0105933 A1 | 4/2015 | Martin |
| 2015/0106010 A1 | 4/2015 | Martin |
| 2015/0120094 A1 | 4/2015 | Kimchi |
| 2015/0178998 A1 | 6/2015 | Attard |
| 2015/0185034 A1 * | 7/2015 | Abhyanker ............ G06Q 50/01 701/23 |
| 2015/0199619 A1 * | 7/2015 | Ichinose ............ G01C 21/3469 705/5 |
| 2015/0248131 A1 | 9/2015 | Fairfield et al. |
| 2015/0338849 A1 | 11/2015 | Nemec et al. |
| 2015/0339928 A1 | 11/2015 | Ramanujam |
| 2015/0377635 A1 | 12/2015 | Beaurepaire et al. |
| 2015/0379437 A1 * | 12/2015 | Reich ..................... G06Q 10/02 705/5 |
| 2016/0033963 A1 | 2/2016 | Noh |
| 2016/0054140 A1 | 2/2016 | Breed |
| 2016/0061612 A1 | 3/2016 | You |
| 2016/0117610 A1 | 4/2016 | Ikeda |
| 2016/0125735 A1 | 5/2016 | Tuukkanen |
| 2016/0189098 A1 | 6/2016 | Beaurepaire |
| 2016/0209220 A1 | 7/2016 | Laetz |
| 2016/0209842 A1 | 7/2016 | Thakur |
| 2016/0209843 A1 | 7/2016 | Meuleau |
| 2016/0209845 A1 | 7/2016 | Kojo |
| 2016/0334797 A1 | 11/2016 | Ross |
| 2017/0083957 A1 | 3/2017 | Ross |
| 2017/0115125 A1 | 4/2017 | Outwater |
| 2017/0153714 A1 | 6/2017 | Gao |
| 2017/0262802 A1 | 9/2017 | Swanson |
| 2018/0114258 A1 | 4/2018 | Ross |
| 2018/0114259 A1 | 4/2018 | Ross |
| 2018/0322546 A1 | 11/2018 | Ross |

FOREIGN PATENT DOCUMENTS

| | | |
|---|---|---|
| DE | 102006034129 | 1/2008 |
| EP | 2295281 | 3/2015 |
| JP | 2005275678 | 10/2005 |
| JP | 2014-211862 | 11/2014 |
| JP | 2014211862 | 11/2014 |
| KR | 10-406192 | 6/2014 |
| WO | WO 2006-011158 A2 | 2/2006 |
| WO | WO 2011-066468 | 6/2011 |
| WO | WO2015/157974 | 10/2015 |
| WO | WO 2015-157974 | 10/2015 |
| WO | WO 2015-169204 | 11/2015 |

OTHER PUBLICATIONS

APC Magazine, "Inside NFC: how near field communication works", Aug. 2011, http://www.apcmag.com/inside-nfc-how-near-field-communication-works.htm/, 2 pages.
APC Magazine, "Inside NFC: how near field communication works", Aug. 2011, APC Magazine, http://www.apcmag.com/ inside-nfc-how- near-field-communication-works.htm/, 2011.
Supplementary European Search Report for EP 16793657 dated Nov. 30, 2018, 2 pages.
2019Extended European Search Report for EP 16867359.8, dated Sep. 11, 2018, 10 pages.
First Office Action for CN 201680041378.3, dated Jul. 24, 2018, 20 pages.
International Search Report and Written Opinion for PCT/US2016/063203, dated Feb. 16, 2017, 14 pages.
International Search Report and Written Opinion for PCT/US2016/032549, dated Aug. 11, 2016, 21 pages.
International Search Report and Written Opinion for PCT/US2017/034819, dated Sep. 14, 2017, 9 pages.

(56) References Cited

OTHER PUBLICATIONS

Office Action for U.S. Appl. No. 15/849,432, dated Feb. 8, 2018, 18 pages.
Office Action for U.S. Appl. No. 15/849,462, dated Feb. 9, 2018, 31 pages.
Rigole, "Study of a Shared Autonomous Vehicles Based Mobility Solution in Stockholm", Royal Institute of Technology, Mater of Science Thesis, 2014, 41 pages.
Third Office Action dated Feb. 19, 2019 in CN 201680041378.3 (UP-103CN), 1 page.
Zachariah, "Are We There Yet? A Proposal for an Autonomous Taxis System in New Jersey and a Preliminary Foundation for Empty Vehicle Routing", Princeton University, Bachelor of Science in Engineering, 2013, 79 pages.

\* cited by examiner

FACILITATING RIDER PICK-UP FOR A SELF-DRIVING VEHICLE

PRIORITY CLAIM

The present application is a continuation of U.S. application Ser. No. 15/606,451 having a filing date of May 26, 2017, which claims the benefit of U.S. Provisional Application Ser. No. 62/342,797 filed May 27, 2016. Applicant claims priority to and benefit of all such applications and incorporate all such applications herein by reference.

BACKGROUND

Passenger transportation services typically require rendezvous locations to facilitate efficient pick-ups. On demand ride services—such as those provided by UBER, Inc. — can link riders and drivers by accepting pick-up requests from riders, identifying proximate drivers to service such requests, inviting drivers to service the requests, and transmitting the pick-up locations of the riders to the drivers once accepted. The rendezvous between human riders and drivers can involve various well-understood gestures that communicate intent in order to perfect the pick-up. Such gestures can include hand signaling, eye contact, and body language that are intuitively understood. Furthermore, when a pick-up is difficult, such as in a crowded or complicated area, the driver can phone the rider in order coordinate a specified pick-up location.

Autonomous vehicles (AVs) or self-driving vehicles (SDVs) can perform continuous sensor data processing in order to operate through road traffic on public roads in order to match or even surpass human capabilities. AVs and SDVs can be equipped with many kinds of sensors, including stereoscopic cameras, LiDAR, radar, proximity sensors, and the like. However, one disadvantage of such vehicles is during rendezvous events with requesting riders when a primary pick-up location is unavailable, such as in crowded areas or when a specified location is occupied by another vehicle. While being effective in operating through road traffic, AVs and SDVs are not able to provide the various human gestures readily understood by current transportation service users.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

A self-driving car (SDV) is disclosed that can optimize pick-ups with requesting users. The SDV can communicate with a backend transport facilitation system that manages a transportation arrangement service for users throughout a given region. The transport facilitation system can comprise a number of backend datacenters that can provide users with a designated application that can enable users to submit pick-up requests on their mobile devices. The transport facilitation system may then utilize a pick-up location or area in the pick-up request, identify a number of vehicles (human-driven vehicles or SDVs) proximate to the pick-up area, and select a vehicle or transmit an invitation to a vehicle to service the pick-up request. Thereafter, the selected vehicle or invited driver can accept the request and drive to the pick-up area to rendezvous with the requesting user.

Over time, the transport facilitation system can gather pick-up data indicating successes and troubles in picking up users in certain areas. For example, the transport facilitation system can track vehicle locations dynamically and identify failed pick-ups or situations in which the rendezvous takes an abnormally long time or when vehicles must perform loop around actions to perfect the pick-up. Such failed or problematic pick-ups can be identified by the transport facilitation system and attributed to one or more causes, such as the requesting user being late or pre-occupied, the crowded nature of the pick-up area, traffic, and/or lack of defined pick-up locations at the pick-up area. Conversely, the transport facilitation system can analyze pick-up data for such problematic areas that indicate relative success and low pick-up times. The transport facilitation system can utilize such data to identify specified pick-up location options for each pick-up area indicated in a pick-up request.

As provided herein, a "pick-up location option" or a "set of pick-up location options" can comprise one or more specific pick-up locations (e.g., a set of parking spaces, a proximate street corner, a pull-off area, a shopping area, a wide-shouldered road segment, etc.) for a particular "pick-up area" indicated in a pick-up request. In many examples, the requesting user can set a location pin on a particular location on a mapping resource, generated by a designated application on the user's mobile computing device, to indicate a desired pick-up location. When receiving "a pick-up location" from the requesting user, the transport facilitation system and/or the selected SDV itself can expand the inputted location to a "pick-up area" (e.g., a radius of twenty or forty meters for the inputted location pin) in order to generate a set of pick-up location options for an SDV selected to service the pick-up request. As described herein, such pick-up location options can be determined by the transport facilitation system over time by analyzing historical pick-up data.

According to examples provided herein, when the SDV approaches the pick-up area, the SDV may utilize real-time sensor data from on-board sensors (e.g., LiDAR, radar, stereoscopic cameras, etc.) to perform a hierarchical operation (e.g., an algorithmic pick-up location selection operation that includes cost probability calculations for each detected or encountered pick-up location option) to converge on an optimal pick-up location to rendezvous with the requesting user. In certain implementations, the selected SDV can leverage the previously determined pick-up location options for the pick-up location area, rank the options based on a set of criteria (e.g., proximity to the inputted location pin, average pick-up delta for the option, current traffic conditions, option encounter order), and utilize the sensor data as the SDV approaches the pick-up area to determine an availability of the options.

For example, as the SDV approaches the pick-up area, the SDV can make the availability determinations based on encounter time (e.g., first encountered options first) and calculate a probability of whether a higher ranked available option will be encountered in relation to a current option. Thus, if an available low ranked option is encountered first, in certain conditions the SDV may disregard the option and hold out for a higher ranked available option. Such a hierarchical selection process can be performed by the SDV as a number of cost probability calculations with primary concerns corresponding to a successful pick-up on the first attempt, time delta between the SDV stopping and the user entering the SDV (e.g., walking time), distance between the location option and the inputted pick-up location or actual location of the requesting user, and potential hindrance on traffic.

Communications between the SDV and the requesting user can be initiated by the SDV or the requesting user at any time. Such communications can be relayed through the transport facilitation system, or can be transmitted between the SDV and the requesting user's mobile computing device directly (e.g., using cellular data channels or via direct connection such as Bluetooth, Wi-Fi, or WiGig). In some examples, the transport facilitation system can transmit identifying information of the user's mobile computing device to the SDV, such as the user's phone number, or an on-application unique identifier. The SDV can utilize such information to communicate, for example, a confirmation corresponding to an optimal pick-up location (e.g., when the SDV arrives at the pick-up area), a set of options for the user to choose, a query to the user when options are unavailable, instructions for the user to meet the SDV at an alternate location, status reports, and the like. Furthermore, certain communications can be initiated in accordance with the hierarchical operation performed by the SDV, and can be triggered by certain instances, such as when none of the ranked options are available.

Among other benefits, the examples described herein achieve a technical effect of maximizing pick-up efficiency between a requesting user and an SDV selected to provide transport for the requesting user. The SDV can expand an inputted pick-up location into a pick-up area that includes a number of pick-up location options previously determined to achieve a relative rate of success and seamlessness. In many implementations, the SDV can determine a ranking for the options, and as the SDV approaches the pick-up area, run a hierarchical selection operation to converge on an optimal location to rendezvous with the requesting user.

As used herein, a computing device refers to devices corresponding to desktop computers, cellular devices or smartphones, personal digital assistants (PDAs), laptop computers, tablet devices, virtual reality (VR) and/or augmented reality (AR) devices, wearable computing devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method.

Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, network equipment (e.g., routers), and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Numerous examples are referenced herein in context of a self-driving vehicle (SDV) or an autonomous vehicle (AV). A SDV or AV refers to any vehicle which is operated in a state of automation with respect to steering and propulsion. Different levels of autonomy may exist with respect to AVs, however, it is generally accepted that a fully autonomous vehicle is referred to as an SDV, and can operate without any human intervention.

System Description

Figure 1:
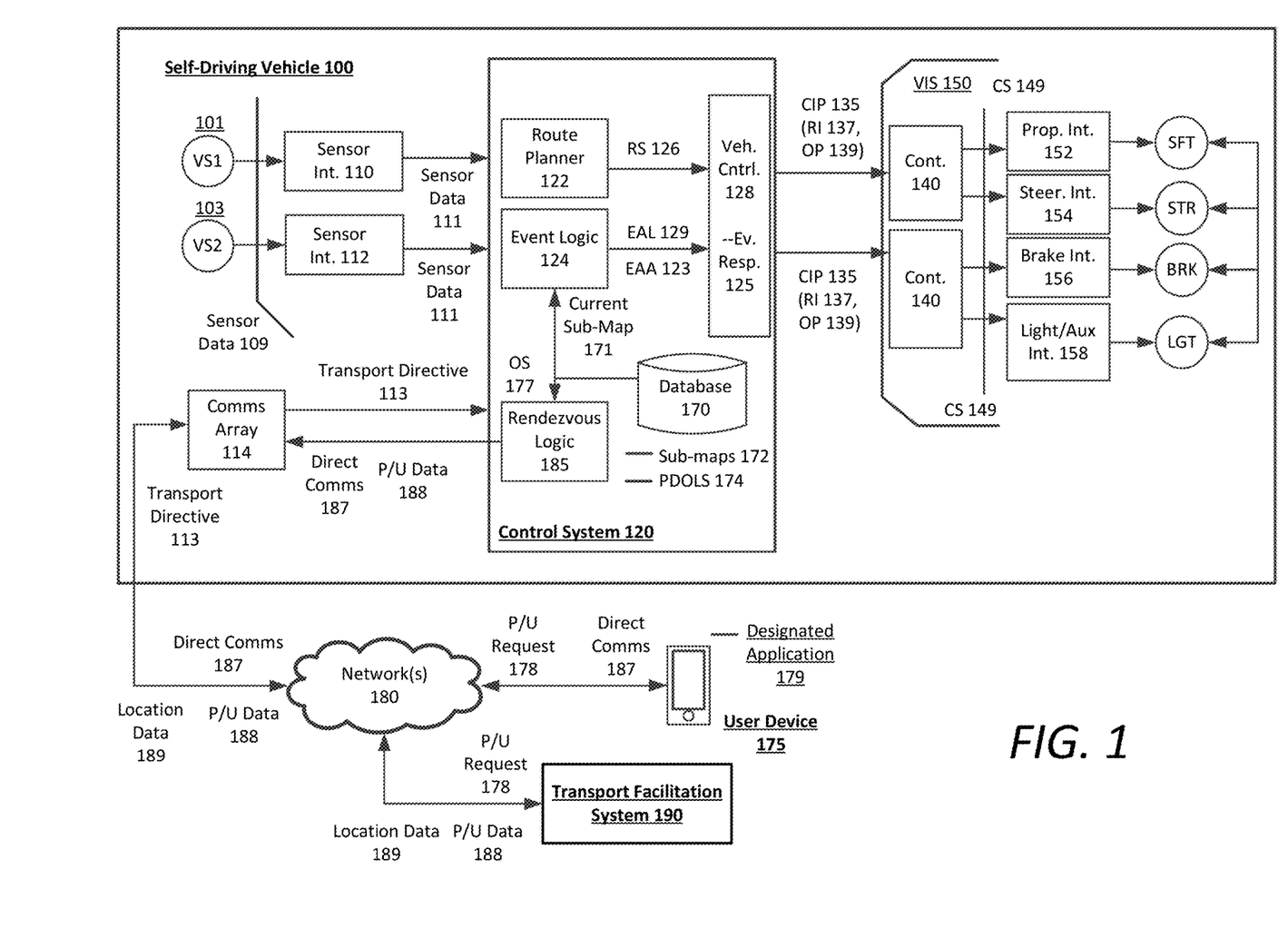
FIG. 1 is a block diagram illustrating an example transport facilitation system in communication with user devices and a fleet of transport vehicles, as described herein.

FIG. 1 is a block diagram illustrating an example self-driving vehicle (SDV) implementing a control system, as described herein. In an example of FIG. 1, a control system 120 can autonomously operate the SDV 100 in a given geographic region for a variety of purposes, including transport services (e.g., transport of humans, delivery services, etc.). In examples described, self-driving vehicle can operate without human control. For example, in the context of automobiles, an SDV 100 can autonomously steer, accelerate, shift, brake, and operate lighting components without human intervention. Some variations also recognize that an SDV 100 can be operated either autonomously in a fully autonomous mode, or may be switched to a manual mode in which a human driver may take at least partial control.

In many examples, the SDV 100 can include a wireless communication interface or communications array 114 to communicate with a backend, transport facilitation system 190. As provided herein, the transport facilitation system 190 can comprise one or more backend servers (e.g., a regional datacenter) that provide a transportation arrangement service to connect requesting users—via an executing rider application on the users' mobile devices—with available drivers or SDVs. Thus, the transport facilitation system can manage the transportation arrangement service for a given region in which the SDV 100 operates. In doing so, the transport facilitation system 190 can connect users with SDVs and/or human driven vehicles for transportation purposes in an on-demand basis. Specifically, the transport facilitation system 190 can provide a designated application 179 to be executed on the user devices 175 (e.g., mobile computing devices), which can enable the user to submit a pick-up request 178 to the transport facilitation system 190 over one or more networks 180. The transport facilitation system 190 can utilize location data 189 from various SDVs and human-driven vehicles throughout the given region, and select a vehicle proximate to the requesting user's current or inputted location to service the pick-up request 178. In the example provided, the transport facilitation system 190 selects SDV 100 to service the pick-up request 178 based at least in part on the proximity between the SDV 100 and the pick-up location indicated in the pick-up request 178.

Based on the selection, the transport facilitation system 190 can generate and transmit a transport directive 113 to the SDV 100 to service the pick-up request 178. The transport directive 113 can be received by the communications array 114 and can be transmitted to the control system 120 of the SDV 100. In one example, the transport directive 113 can comprise a an instruction to the control system 120 to operate the SDV 100 to autonomously drive to the pick-up location area in order to rendezvous with the requesting user. In other implementations, the transport directive 113 can comprise an invitation, which control system 120 can first accept or deny prior to committing to the pick-up request 178.

In one implementation, the control system 120 can utilize specific sensor resources in order to intelligently operate the vehicle 100 in most common driving situations. For example, the control system 120 can operate the vehicle 100 by autonomously steering, accelerating, and braking the vehicle 100 as the vehicle progresses to a destination. The control system 120 can perform vehicle control actions (e.g., braking, steering, accelerating) and route planning using sensor information, as well as other inputs (e.g., transmissions from remote or local human operators, network communication from other vehicles, etc.).

In an example of FIG. 1, the control system 120 includes a computer or processing system which operates to process sensor data that is obtained on the vehicle 100 with respect to a road segment upon which the vehicle 100 operates. The sensor data can be used to determine actions which are to be performed by the vehicle 100 in order for the vehicle 100 to continue on a route to a destination. In some variations, the control system 120 can include other functionality, such as wireless communication capabilities, to send and/or receive wireless communications with one or more remote sources. In controlling the vehicle 100, the control system 120 can issue instructions and data, shown as commands 135, which programmatically control various electromechanical interfaces of the vehicle 100. The commands 135 can serve to control operational aspects of the vehicle 100, including propulsion, braking, steering, and auxiliary behavior (e.g., turning lights on).

The SDV 100 can be equipped with multiple types of sensors 101, 103 which can combine to provide a computerized perception of the space and environment surrounding the vehicle 100. Thus, the control system 120 can continuously assess a situational environment of the SDV 100 when operating the acceleration, braking, and steering systems through road and pedestrian traffic on public roads and highways. Likewise, the control system 120 can operate within the SDV 100 to receive sensor data 111 from the collection of sensors 101, 103, and to control various electromechanical interfaces for operating the vehicle 100 on roadways.

In more detail, the sensors 101, 103 operate to collectively obtain a complete sensor view of the vehicle 100, and further to obtain situational information proximate to the vehicle 100, including any potential hazards proximate to the vehicle 100. By way of example, the sensors 101, 103 can include multiple sets of camera sensors 101 (video cameras, stereoscopic pairs of cameras or depth perception cameras, long range cameras), remote detection sensors 103 such as provided by radar or LIDAR, proximity or touch sensors, and/or proximity or sonar sensors (not shown).

Each of the sensors 101, 103 can communicate with the control system 120 utilizing a corresponding sensor interface 110, 112. Each of the sensor interfaces 110, 112 can include, for example, hardware and/or other logical components which are coupled or otherwise provided with the respective sensor. For example, the sensors 101, 103 can include a video camera and/or stereoscopic camera set which continually generates image data of an environment of the vehicle 100. As an addition or alternative, the sensor interfaces 110, 112 can include a dedicated processing resource, such as provided with a field programmable gate array ("FPGA") which can, for example, receive and/or process raw image data from the camera sensor.

In some examples, the sensor interfaces 110, 112 can include logic, such as provided with hardware and/or programming, to process sensor data 109 from a respective sensor 101, 103. The processed sensor data 109 can be outputted as sensor data 111. As an addition or variation, the control system 110 can also include logic for processing raw or pre-processed sensor data 109.

According to one implementation, the vehicle interface subsystem 150 can include or control multiple interfaces to control mechanisms of the vehicle 100. The vehicle interface subsystem 150 can include a propulsion interface 152 to electrically (or through programming) control a propulsion component (e.g., an accelerator actuator), a steering interface 154 for a steering mechanism, a braking interface 156 for a braking component, and a lighting/auxiliary interface 158 for exterior lights of the vehicle 100. The vehicle interface subsystem 150 and/or the control system 120 can further include one or more controllers 140 which can receive commands 135 from the control system 120. The commands 135 can include route information 137 and operational parameters 139 —which specify an operational state of the vehicle 100 (e.g., desired speed and pose, acceleration, etc.).

The controller(s) 140 can generate control signals 149 in response to receiving the commands 135 for one or more of the vehicle interfaces 152, 154, 156, 158. The controllers 140 can use the commands 135 as input to control propulsion, steering, braking, and/or other vehicle behavior while the SDV 100 follows a current route. Thus, while the SDV 100 actively drives along the current route, the controller(s) 140 can continuously adjust and alter the movement of the vehicle 100 in response to receiving a corresponding set of commands 135 from the control system 120. Absent events or conditions which affect the confidence of the SDV 100 in safely progressing along the route, the control system 120 can generate additional commands 135 from which the controller(s) 140 can generate various vehicle control signals 149 for the different interfaces of the vehicle interface subsystem 150.

In various implementations, the control system 120 can include a database 170 that stores operational sub-maps 172 for the given region. These sub-maps 172 can comprise previous recorded, analyzed, and processed sensor maps of the given region. For example, the sub-maps 172 can include surface maps (e.g., LiDAR and/or stereoscopic camera-based maps) to which the control system 120 can continuously compare with the real-time sensor data 111. In some aspects, each sub-map can represent a road segment of the given region from a particular direction, and can include processed sensor data that indicates all, or nearly all, static objects and features that the SDV 100 can expect to encounter on that particular road segment (e.g., lanes, traffic signals, signs, telephone poles, overpasses, parking meters, parking areas or locations, buildings, houses, trees, structures, background features, and the like). Accordingly, the control system 120 can dynamically analyze the real-time sensor data 111 from the sensors 101, 103 of the SDV 100 in view of a current sub-map 171 in order to dynamically determine its location and orientation within the given region, and detect and resolve any potential hazards to maneuver the SDV 100 and avoid such hazards if necessary.

According to examples, the commands 135 can specify actions to be performed by the vehicle 100. The actions can correlate to one or multiple vehicle control mechanisms (e.g., steering mechanism, brakes, etc.). The commands 135 can specify the actions, along with attributes such as magnitude, duration, directionality, or other operational characteristics of the SDV 100. By way of example, the commands 135 generated from the control system 120 can specify a relative location of a road segment which the SDV 100 is to occupy while in motion (e.g., change lanes, move into a center divider or towards the shoulder, perform a turn, etc.). As other examples, the commands 135 can specify a speed, a change in acceleration (or deceleration) from braking or accelerating, a turning action, or a state change of exterior lighting or other components. The controllers 140 can translate the commands 135 into control signals 149 for a corresponding interface of the vehicle interface subsystem 150. The control signals 149 can take the form of electrical signals which correlate to the specified vehicle action by virtue of electrical characteristics that have attributes for magnitude, duration, frequency or pulse, or other electrical characteristics.

In an example of FIG. 1, the control system 120 can include a route planner 122, event logic 124, and a vehicle control 128. The vehicle control 128 represents logic that converts alerts of event logic 124 ("event alert 129") into commands 135 that specify a set of vehicle actions. According to examples described herein, the control system 120 can further include rendezvous logic 185 that can facilitate in the SDV 100 successfully and seamlessly making pickups.

In example implementations, the route planner 122 can select one or more route segments 126 that collectively form a path of travel for the SDV 100 when the vehicle 100 is on a current trip (e.g., servicing a pick-up request). In one implementation, the route planner 122 can specify route segments 126 of a planned vehicle path which defines turn by turn directions for the vehicle 100 at any given time during the trip. The route planner 122 may utilize the sensor interface 112 to receive GPS information as sensor data 111. The vehicle control 128 can process route updates from the route planner 122 as commands 135 to progress along a path or route using default driving rules and actions (e.g., moderate steering and speed).

In certain implementations, the event logic 124 can trigger a response to a detected event. A detected event can correspond to a roadway condition or obstacle which, when detected, poses a potential hazard or threat of collision to the vehicle 100. By way of example, a detected event can include an object in the road segment, heavy traffic ahead, and/or wetness or other environmental conditions on the road segment. The event logic 124 can use sensor data 111 from cameras, LIDAR, radar, sonar, or various other image or sensor component sets in order to detect the presence of such events as described. For example, the event logic 124 can detect potholes, debris, objects projected to be on a collision trajectory, and the like. Thus, the event logic 124 can detect events which enable the control system 120 to make evasive actions or plan for any potential hazards.

In certain implementations, the event logic 124 can dynamically compare the sensor data 111 with current sub-maps 171 as the SDV 100 travels throughout the given region. In some aspects, as the SDV 100 crosses into a subsequent road segment, the event logic 124 can access a new current sub-map 171 from the database 170 in order to continuously process the sensor data 111.

When events are detected, the event logic 124 can signal an event alert 129 that classifies the event and indicates the type of avoidance action to be performed. Additionally, the control system 120 can determine whether an event corresponds to a potential incident with a human driven vehicle, a pedestrian, or other human entity external to the SDV 100. In turn, the vehicle control 128 can determine a response based on a score or classification of the event. Such response can correspond to an event avoidance action 123, or an action that the vehicle 100 can perform to maneuver the vehicle 100 based on the detected event and its score or classification. By way of example, the vehicle response can include a slight or sharp vehicle maneuvering for avoidance using a steering control mechanism and/or braking component. The event avoidance action 123 can be signaled through the commands 135 for controllers 140 of the vehicle interface subsystem 150.

When an anticipated dynamic object of a particular class does in fact move into position of likely collision or interference, some examples provide that event logic 124 can signal the event alert 129 to cause the vehicle control 128 to generate commands 135 that correspond to an event avoidance action 123. For example, in the event of a bicycle crash in which the bicycle (or bicyclist) falls into the path of the vehicle 100, the event logic 124 can signal the event alert 129 to avoid the collision. The event alert 129 can indicate (i) a classification of the event (e.g., "serious" and/or "immediate"), (ii) information about the event, such as the type of object that generated the event alert 129, and/or information indicating a type of action the vehicle 100 should take (e.g., location of object relative to path of vehicle, size or type of object, etc.).

According to examples described herein, SDV 100 can include a communications array 114 to communicate over one or more networks 180 with a backend, transport facilitation system 190, such as the transport facilitation system 100 described with respect to FIG. 1. In some aspects, when the SDV 100 is selected to service a pick-up request, the communications array 114 can receive a transport directive 113 from the transport facilitation system 190 to service the pick-up request and drive to a pick-up location to rendezvous with the requesting user. In such aspects, the transport directive 113 can be transmitted to the route planner 122 in order to autonomously drive the SDV 100 to the pick-up location area.

In various implementations, the control system 120 can expand the pick-up location into a pick-up area with a certain radius (e.g., forty meters) from the inputted pick-up location by the requesting user. Furthermore, the database 170 of the SDV 100 can store pick-up and drop-off location sets 174 (PDOLS 174) for specified location areas. The PDOLS 174 can be determined by the transport facilitation system 190 over time by collecting and analyzing pick-up data 188 (and/or drop off data) from any number of AVs, SDVs, or human-driven vehicles to identify specific optimal locations on a fine granular level. Thus, if a requesting user inputs a pick-up location into a pick-up request 178 —which may be indicated in the transport directive 113—the rendezvous logic 185 can expand the pick-up location into a pick-up area, and perform a lookup in the PDOLS 174 to identify a set of pick-up location options, or an options set 177, to rendezvous with the requesting user. In some examples, the rendezvous logic 185 can treat the inputted pick-up location as a reference point (e.g., a radial center) for a pick-up area that encompasses one or multiple specific location options determined to have high success rates and low pick-up times.

In variations, the PDOLS 174 can be stored at the transport facilitation system 190 and accessed by the control system 120 via the network(s) 180. Additionally, in some examples, the transport facilitation system 190 can receive the pick-up request 178, identify the pick-up location, expand the pick-up location into a pick-up area, and determine a set of one or more pick-up location options within the pick-up area. Thus, in such implementations, the transport directive 113, or subsequent transmission, can include data indicating the set of pick-up location options 177 corresponding to the pick-up area.

Whether determined by the transport facilitation system 190 or the SDV 100, the rendezvous logic 185 can utilize the options set 177 as the SDV 100 approaches the pick-up area to determine an optimal pick-up location to rendezvous with the requesting user. In one example, the options set 177 can comprise a ranked set of location options according to such factors as average success rate (e.g., a rate in which the initial pick-up attempt was successful), an average pick-up time (e.g., the time between the vehicle stopping and pulling away), and can factor in distances between the inputted pick-up location by the requesting user and the actual pick-up location, any obstacles or hindrances between them (e.g., a road or intersection), and the like. In certain examples, the SDV 100 ranks the options set 177 based, at least in part, on (i) the historical data from the transport facilitation system 190 (e.g., success rates and/or pick-up deltas for each option), and (ii) the inputted location by the requesting user. Utilizing this ranking, the control system 120 can perform the hierarchical selection operation as the SDV 100 approaches the pick-up area and begins to detect the pick-up location options in the options set 177.

Thus, as the control system 120 operates the acceleration, braking, and steering systems of the SDV 100 along the current route to within a certain distance from the pick-up area, the control system can trigger the rendezvous logic 185 to begin analyzing the sensor data 111 based on the options set 177. In one example, the SDV 100 utilizes the determined ranking of the options set 177 and performs the selection operation by identifying an availability of each of the ranked options as the SDV 100 encounters and detects them. In such an example, the rendezvous logic 185 can, on a high level, check off each of the encountered pick-up location options in the options set 177 in a binary manner (e.g., either available or unavailable).

On a more granular level, when the SDV 100 enters the pick-up area, the rendezvous logic 185 can further perform a cost analysis of whether to halt the SDV 100 at an encountered available option, or hold out for a higher ranked available option yet to be detected. According to various implementations, an encountered low ranked available option may require the requesting user to walk a certain distance (e.g., twenty or thirty meters), which increases the pick-up delta. For this low-ranked option, the rendezvous logic 185 can process the sensor data 111 to identify such criteria as traffic conditions, an occupancy factor for proximate stopping areas (e.g., heavily occupied, moderately occupied, or lightly occupied), the number of remaining options in the ranked options set 177, the rankings of such remaining options, the distance to the inputted pick-up location, etc. Based on the criteria, the rendezvous logic 185 may determine a probability that a future higher-ranked encountered option will be available. Accordingly, if the probability exceeds a certain threshold (e.g., sixty-five percent), then the rendezvous logic 185 can instruct the vehicle control 128 to continue through the pick-up area until the rendezvous logic 185 identifies a better available option in the set 177.

According to examples provided herein, the cost analysis may be performed by the rendezvous logic 185 for each option in the options set 177 as they are encountered, and until the rendezvous logic 185 calculates a probability, corresponding to a currently encountered pick-up location option, that does not exceed the threshold. In other words, when the SDV 100 approaches a specific pick-up location option in the options set 177 in which the probability of a better future option is below the threshold, the rendezvous logic 185 can instruct the vehicle control 128 to pull over and/or stop at the currently encountered pick-up location option. Thus, when the SDV 100 enters the pick-up area, and the sensors 101, 103 begin detecting the pick-up location options, the rendezvous logic 185 can dynamically identify availability of encountered options and, if available, can dynamically calculate the probability of encountering a better option without having to perform a loop around action for a second attempt. Accordingly, the rendezvous logic 185 can perform this hierarchical selection operation in order to converge on an optimal pick-up location from the options set 177. However, it is contemplated that this optimal location may or may not be the highest ranked, or even the highest ranked available option in the option set 177. For example, the rendezvous logic 185 may determine that a currently encountered pick-up location option suffices for the pick-up based on location options that are potentially more optimal, but are further up the road and cannot be detected.

In certain implementations, the rendezvous logic 185 can further attempt to identify the requesting user, and take into account the exact location of the requesting user when performing the cost analyses. In one example, the SDV 100 can be provided with the user's location from the transport facilitation system 190, which can track the location via GPS resources of the user device. In variations, the rendezvous logic 185 can detect the user utilizing various other methods, such as detecting the user holding up a hand in a hailing manner, or the user holding up the user device 175, which can output a certain display feature or pattern. In some aspects, the detected location of the user may not exactly correlate with the inputted pick-up location by the user. For example, the user may input a location that is twenty or thirty meters from where the user is actually located. According to examples, in detecting the user, the rendezvous logic 185 can dynamically override the ranking of options and prioritize options closer to the user's actual location. For example, as the rendezvous logic 185 dynamically performs the cost analyses for each option (e.g., based, at least in part, on the inputted location by the user), the rendezvous logic 185 can detect the requesting user. As the SDV 100 continues through the pick-up area, the rendezvous logic 185 can override the rankings, and restructure the probability calculations based on the actual location of the user, as opposed to the inputted location. Accordingly, the rendezvous logic 185 can alter the factors of the probability calculation, which can be triggered by the detection of the requesting user.

Additionally or alternatively, the rendezvous logic 185 can communicate with the requesting user directly over a network 180. In certain implementations, the rendezvous logic 185 can be partially dependent on the requesting user in performing the pick-up. For example, as the SDV 100 approaches the pick-up area, the rendezvous logic 185 can transmit a direct communication 187 to the user device 175 of the requesting user. In some examples, this direct communication 187 can query the user of whether an available pick-up location is proximate to the user (e.g., within ten meters). If the user answers in the affirmative, then the rendezvous logic 185 can negate the cost calculations and instruct the vehicle control 128 to drive to the available location. For example, the user can input a current location on the designated application 179, which can be transmitted to the SDV 100, and utilized by the vehicle control 128 to drive to the user. Further, the direct communications 187 can provide a confirmation to the user device 175 that the SDV 100 has found an optimal pick-up location, and can provide details to the user of the location.

In certain examples, the direct communications 187 between the SDV 100 and the user device 175 are relayed through the transport facilitation system 190. In such examples, the SDV 100 and the user device 175 do not communicate directly, and the user device 175 can receive such communications 187 over the designated application 179. In variations, the SDV 100 can receive identifying information of the user device 175 from the transport facilitation system 190 (e.g., in the transport directive 113). In such variations, once the SDV 100 is within wireless range of the user device 175, the SDV 100 can scan for wireless signals or otherwise detect such signals (e.g., a beacon from the user device 175), and establish a direct local connection with the user device 175 (e.g., a Bluetooth, Wi-Fi, or WiGig connection). Thereafter, the direct communications 187 between the SDV 100 and the user device 175 can be transmitted over this direct connection.

According to some examples, when the SDV 100 approaches the pick-up area, the rendezvous logic 185 can provide the user device 175 with status updates indicating, for example, that the SDV 100 is searching for an optimal pick-up location, or that the SDV 100 has identified an optimal pick-up location. Additionally or alternatively, once the rendezvous logic 185 identifies an optimal pick-up location, the rendezvous logic 185 can transmit a confirmation to the user device 175 indicating the location. For example, the confirmation can include a mapping feature identifying the immediate surroundings of the location (e.g., road names, intersections, sidewalks, trees, etc.), and an indicator showing the pick-up location (e.g., an arrow or highlight).

In one variation, the rendezvous logic 185 can present the user device 175 with a plurality of available options (e.g., on a mapping feature), and the requesting user can select a particular option from the plurality. The rendezvous logic 185 can then instruct the vehicle control 128 to drive the SDV 100 to the selected location.

In certain examples, a particular pick-up location may not have a corresponding pick-up location options set 177 in the PDOLS 174. In such examples, the rendezvous logic 185 can perform an on-the-fly selection process to determine candidate location options based in part on the inputted location by the user, or the actual location once the requesting user is detected. Other factors in determining an optimal pick-up location without a ranked options set 177 can include traffic conditions, overall availability of pick-up areas (e.g., parking spaces), distance to the inputted or actual location of the user, and the like.

In further examples, the rendezvous logic 185 can determine that none of the pick-up location options are available. In such examples, the rendezvous logic 185 can rely more heavily on direct communications 187 with the user, and/or attempt to make the pick-up by utilizing a reserve option. Such reserve options can include double parking, stopping briefly in a yellow or red zone, taking a next turnout (e.g., into a side street or parking lot), etc. The rendezvous logic 185 can utilize the reserve options only when all other options are exhausted, or when the rendezvous logic 185 fails in a first attempt. Thus, in some examples, the rendezvous logic 185 can keep such reserve options locked, and unlock the reserve options based on one or more triggering events. Such triggering events can include the SDV 100 passing the inputted or actual location of the requesting user, a failed pick-up attempt and loop around action, detection of no available options, and the like. In certain examples, when reserve options are unlocked, the rendezvous logic 185 can transmit an alert to the user device 175 to be aware and ready for a quick pick-up.

Once the pick-up is performed, the control system 120 can operate the acceleration, braking, and steering systems to autonomously drive the SDV 100 to the destination, which can be inputted by the user prior to pick-up or provided to the SDV 100 after pick-up. According to some examples, the drop-off of the requesting user can be performed in a similar manner. For example, as the SDV 100 approaches a crowded destination area, the control system 120 can identify that a drop-off location corresponding to the destination is unavailable. In certain examples, the PDOLS 174 in the database 170 can include drop-off location options and the control system 120 can perform a similar hierarchical selection operation, described herein, for the drop-off. Thus, in some examples, the control system 120 can rank the drop-off location options set 177 (e.g., based on a specified drop-off location in the transport directive 113), and perform the hierarchical selection process to, for example, converge on an optimal drop-off location, as described similarly herein with respect to the pick-up.

In certain implementations, the control system 120 of the SDV 100 can enable the user to have at least partial control over the drop-off. For example, during the ride, the control system 120 can execute speech recognition to translate the user's spoken words into control commands. The translated commands can cause the control system 120 to operate various controllable parameters of the SDV 100 itself. For example, the spoken words of the user can be translated to control the climate control system, the audio and/or display system, certain network services (e.g., phoning, conferencing, content access, gaming, etc.), seat adjustment, and the like. According to examples described herein, the control system 120 can also operate the acceleration, braking, and steering system of the SDV 100 based on certain speech commands from the user. In one aspect, as the SDV 100 approaches the destination, the user can ask or otherwise command the SDV 100 to stop at its current location. In response to this stop command from the user, the control system 120 can perform a quick check of the situational environment to determine a safety factor of a stopping action. If the safety factor is within a certain safety range, or otherwise exceeds a threshold safety level, the control system 120 can cause the SDV 100 to stop at the current location to make the drop-off. However, if the safety factor does not meet such a minimum threshold, then the control system 120 can automatically search for a next available drop-off option in the corresponding drop-off option set, and stop the SDV 100 at the next available option to make the drop-off.

Figure 2:
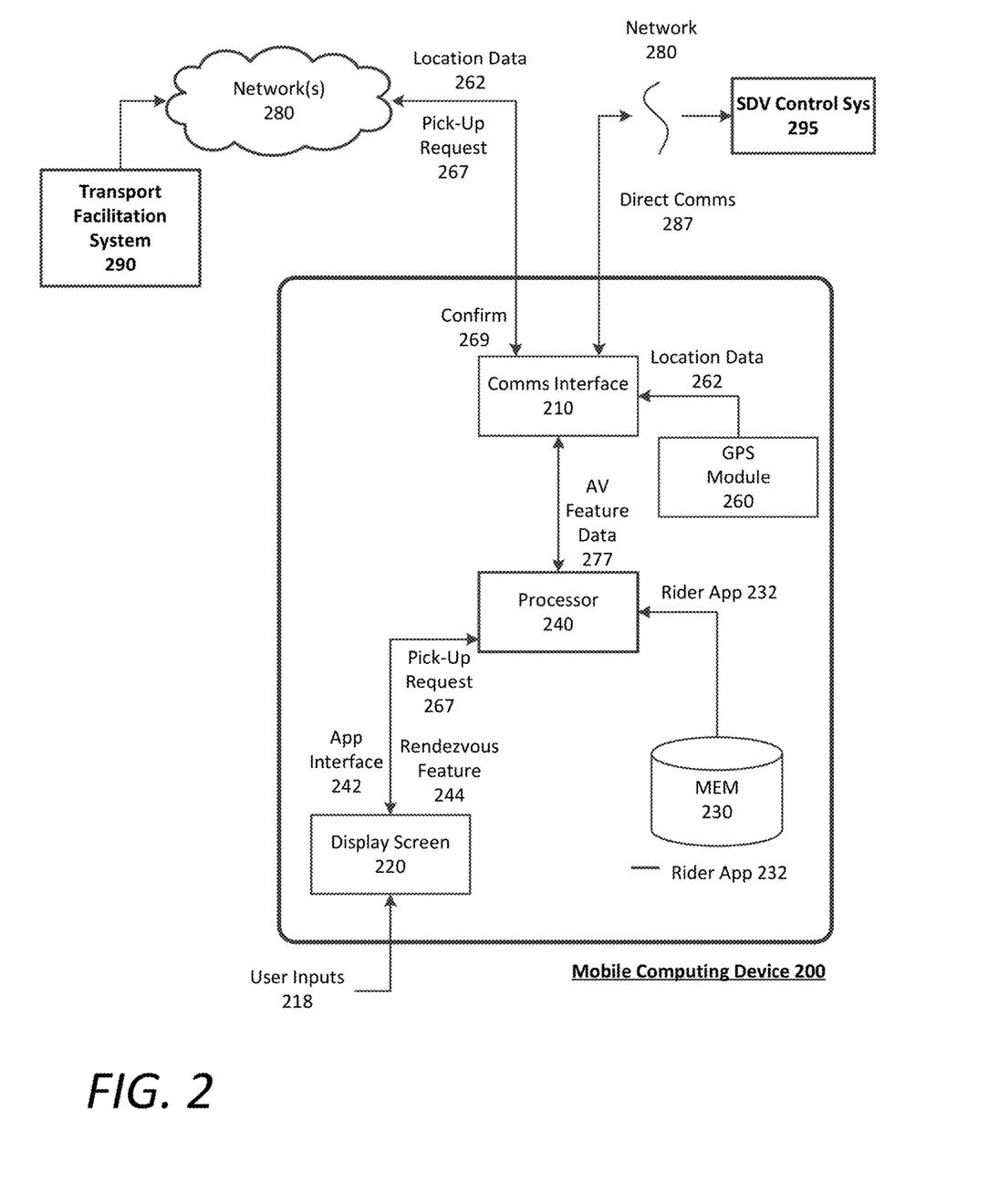
FIG. 2 is a block diagram illustrating an example mobile computing device executing a designated application for a transport arrangement service, as described herein.

FIG. 2 is a block diagram illustrating an example mobile computing device executing a designated application for a transport arrangement service, as described herein. The mobile computing device 200 can store a designated application (e.g., a rider app 232) in a local memory 230. In response to a user input 218, the rider app 232 can be executed by a processor 240, which can cause an app interface 242 to be generated on a display screen 220 of the mobile computing device 200. The app interface 242 can enable the user to, for example, check current price levels and availability for the transportation arrangement service. In various implementations, the app interface 242 can further enable the user to select from multiple ride services, such as a carpooling service, a regular rider service, a professional rider service, a van transport service, a luxurious ride service, and the like. Example services that may be browsed and requested can be those services provided by UBER Technologies, Inc. of San Francisco, Calif.

The user can generate a pick-up request 267 via user inputs 218 provided on the app interface 242. For example, the user can select a pick-up location, view the various service types and estimated pricing, and select a particular service for transportation to an inputted destination. In certain implementations, current location data 262 from a GPS module 260 of the mobile computing device 200 can be transmitted to the transport facilitation system 290 over one or more networks 280 to set the pick-up location. In many examples, the user can also input the destination prior to pick-up. The processor 240 can transmit the pick-up request 267 via a communications interface 210 to the backend transport facilitation system 290 over the network 280. In response, the mobile computing device 200 can receive a confirmation 269 from the transport facilitation system 290 indicating that a selected SDV will service the pick-up request 267 and rendezvous with the user at a determined pick-up location.

As the SDV approaches a pick-up area corresponding to the inputted pick-up location, the SDV can perform cost analyses for one or more pick-up location options, as described herein with respect to FIG. 1. As further described, as the SDV performs the hierarchical selection process to find an optimal pick-up location, the mobile computing device 200 and the SDV control system 295 can engage in direct communications 287 in order to coordinate the pick-up. In one aspect, the direct communications 287 can be included on a rendezvous feature 244 displayed on the display screen 220 of the mobile computing device 200 (e.g., via the rider app 232). In certain implementations, the rendezvous feature 244 can enable the user to select a pick-up location option, confirm a selected option, and can provide the user with information corresponding to the optimal pick-up location option. In one aspect, the rendezvous feature 244 can provide a map of the user's immediate surroundings, and can include an indicator that identifies the optimal pick-up location on the map. Thus, in examples in which the user must walk a certain distance (e.g., fifteen to twenty meters), the rendezvous feature 244 can provide the user with the indicator of the rendezvous location as well as low level walking directions to the location.

Methodology

Figure 3:
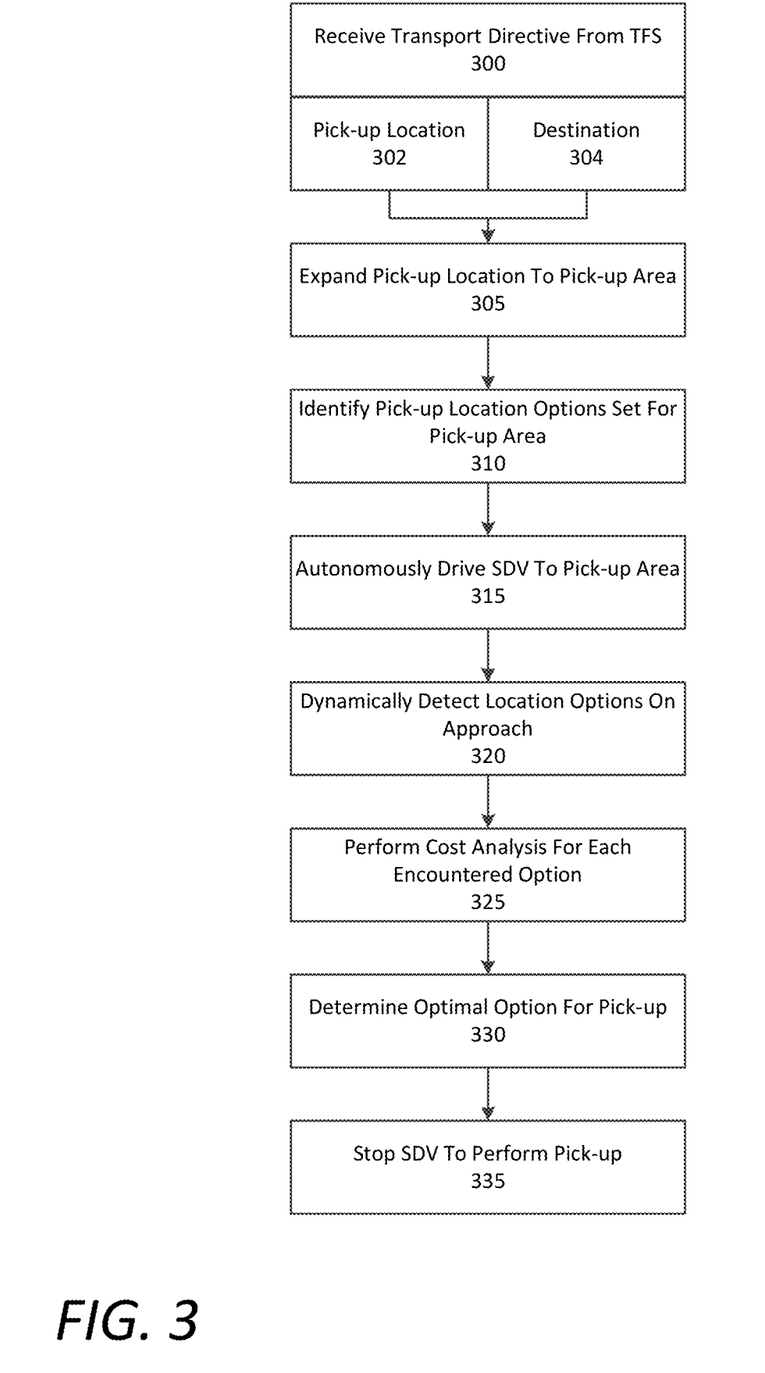
FIG. 3 is a flow chart describing an example method of performing a rendezvous process by a self-driving vehicle (SDV), as described herein.

FIG. 3 is a flow chart describing an example method of performing a rendezvous process by a self-driving vehicle (SDV), as described herein. In the below description of FIG. 3, reference may be made to reference characters representing like features shown and described with respect to FIGS. 1 and 2. Furthermore, the methods and processes described in connection with FIG. 3 can be performed by an example SDV control system 120, 295 as shown and described with respect to FIGS. 1 and 2. Referring to FIG. 3, the control system 120 of the SDV 100 can receive a transport directive 113 from a backend transport facilitation system 190 (300). In some examples, the transport directive 113 can include a pick-up location specified by the requesting user (302). Additionally, the transport directive 113 can include an inputted destination by the requesting user (304).

According to certain examples, the control system 120 can expand the pick-up location to a pick-up area in which the pick-up location comprises a reference point (305). For example, the control system 120 can generate the pick-up area to include a certain number of pick-up location options previously determined to facilitate more efficient pick-ups (e.g., by the transport facilitation system 190 utilizing historical pick-up data). In variations, the control system 120 can utilize the inputted pick-up location as a radial center of the pick-up area, and can perform a lookup in the pick-up/drop-off location sets 174 stored in the database 170 for a pick-up location options set 177 that corresponds to the expanded area. In further variations, each pick-up/drop-off location option set (PDOLS 174) in the database 170 can be associated with a specified pick-up location area. Thus, if the inputted location by the requesting user is within an associated area corresponding to an options set 177, the control system 120 can utilize the options set 177 in performing the pick-up. In any case, the control system 120 can identify a pick-up location options set 177 that corresponds to the pick-up location area (310).

The control system 120 can then operate the acceleration, braking, and steering system of the SDV 100 to autonomously drive the SDV 100 to the pick-up area (315). As the SDV 100 approaches the pick-up area, the control system 120 can utilize the sensor data 111 to dynamically detect location options in the options set 177 (320). Furthermore, in detecting the location options, the control system 120 can determine an availability of each option. In addition, according to examples described herein, the control system 120 may then perform a cost analysis for each of the encountered location options in the options set 177 (325). The cost analysis can include any number of factors, and can output a value that ultimately determines whether the control system 120 will stop the SDV 100 at the encountered or detected option, or whether the control system 120 will continue in the hopes that a future encountered option will be available.

Specifically, the cost analysis for each encountered option in the options set 177 can include inputs such as ranking, pick-up success rate, average pick-up delta time, distance to inputted pick-up location, distance to actual user location, remaining available options, the rankings of such options, whether the SDV 100 has passed the requesting user, and the like. The output of the cost analysis can include a probability that a better option will be encountered or detected after the SDV 100 passes the current encountered option. Thus, if the outputted probability is above a certain threshold (e.g., sixty-five percent), the control system 120 can disregard the current encountered option and continue along the current route. However, if the probability is below the threshold, then the control system 120 can classify the current encountered option as the optimal option for pick-up (330). Thus, the control system 120 can stop the SDV 100 to rendezvous with the requesting user and perform the pick-up accordingly (335).

Figure 4:
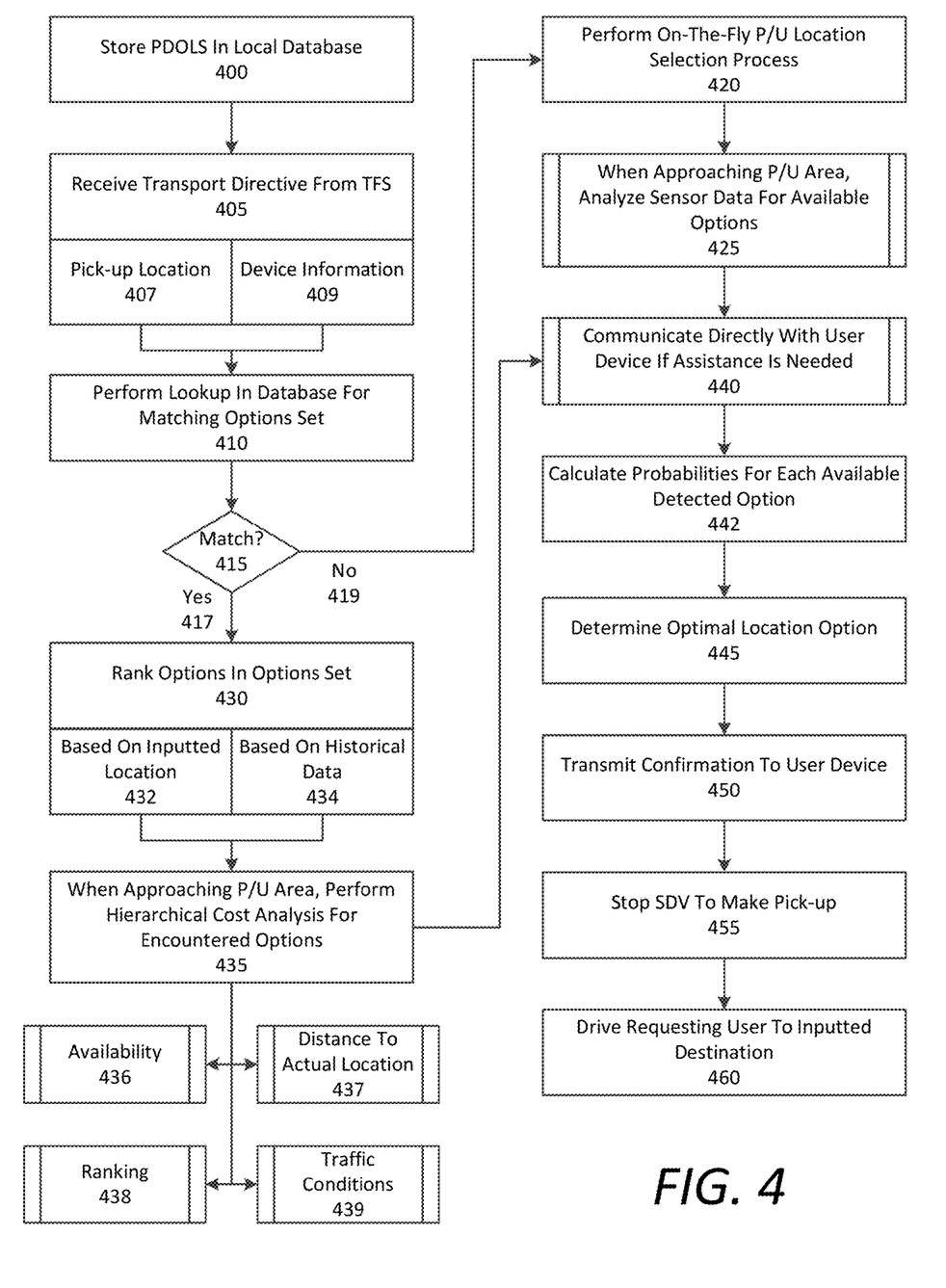
FIG. 4 is a flow chart describing another example method of performing a rendezvous process by a SDV, as described herein.

FIG. 4 is a flow chart describing another example method of performing a rendezvous process by a self-driving vehicle (SDV), as described herein. In the below description of FIG. 4, reference may be made to reference characters representing like features shown and described with respect to FIGS. 1 and 2. Furthermore, the lower level methods and processes described in connection with FIG. 4 can be performed by an example SDV control system 120, 295 as shown and described with respect to FIGS. 1 and 2. Referring to FIG. 4, the control system 120 can store pick-up and drop-off locations sets 174 in a local database 170 (400). In certain variations, the pick-up and drop-off location sets 174 can be stored remotely at the backend transport facilitation system 190, and can be accessed by the SDV 100 when, for example, a particular transport directive 113 is accepted. In further variations, the transport directive 113 itself can include an options set 177 that corresponds to an inputted pick-up location by the requesting user. For example, the transport facilitation system 190 can receive the pick-up request from the user, and perform a lookup in a database that stored pick-up and drop-off location sets 174 for a matching options set 177 for the inputted pick-up location. Furthermore, each options set 177 can include one or more pick-up location options that the transport facilitation system 190 has analyzed, based on historical pick-up data 188, to facilitate relatively efficient pick-ups between SDVs or human driven vehicles and requesting users.

According to examples, the control system 120 of the SDV 100 can receive a transport directive 113 from the transport facilitation system 190 to service a pick-up request from a requesting user (405). As described herein, the transport directive 113 can include at least an inputted pick-up location by the requesting user (407). In variations, the transport directive 113 can further include identifying information of the user (409)—such as a unique identifier of the user's mobile computing device (e.g., a media access control address)—a destination, and/or an options set 177 that corresponds to the inputted pick-up location. Alternatively, the control system 120 can perform a lookup in the database 170 for a matching options set 177 that corresponds to the inputted pick-up location (410). Thus, the control system 120 can determine whether a matching options set 177 is available in the database 170 (415). If a matching options set 177 is not found (419), then the control system 120 can perform an on-the-fly selection process to identify an optimal location to pick-up the requesting user (420).

According to some examples, the on-the-fly selection process can involve the control system 120 analyzing sensor data 111 for available pick-up location options as the SDV 100 approaches the pick-up area (425). Furthermore, the selection process can take into account the distance between an available option and the inputted or actual location of the requesting user. For example, as the SDV 100 approaches the pick-up area, the control system 120 can analyze the sensor data 111 for open pick-up areas (e.g., parking spaces, turn-outs, loading zones, street corners, etc.) that are proximate to the inputted pick-up location or, if identified, the requesting user. Thus, the control system 120 can also scan the situational environment of the SDV 100 for the requesting user in performing the selection process to determine an optimal pick-up location. Furthermore, if an available pick-up location is not readily identified, the control system 120 can initiate communications with the user's mobile computing device 175 to coordinate a pick-up location (440), as described in further detail below.

However, in certain aspects, if a matching options set 177 is identified in the database 170 (417), the control system 120 can rank the pick-up location options in the options set 177 while en route to the pick-up area (430). For example, the control system 120 can rank the pick-up location options based on the inputted location by the user (432). Specifically, the options set 177 can include a plurality of pick-up location options within a predetermined distance from the inputted pick-up location (e.g., fifty meters). Each option can be previously identified by the transport facilitation system 190 as facilitating more efficient pick-ups relative to other specified locations near the inputted pick-up location. The control system 120 can initially rank the options based on proximity to the inputted pick-up location, where the nearest options may be ranked higher than the options that are further away.

Additionally or alternatively, the control system 120 can rank the options based on historical pick-up data 188 indicated in the options set 177. For example, the transport facilitation system 190 can analyze pick-up data 188 over time to determine a set of attributes for each pick-up location option. These attributes can indicate average pick-up times, success rates, and, in some examples, an overall efficiency score calculated by the transport facilitation system 190. Thus, the control system 120 can further rank the options in the options set 177 based on the previously determined attributes. Utilizing the ranked options set 177, the control system 120 can then perform a hierarchical, cost analysis selection process for each encountered option as the SDV 100 approaches the pick-up area (435). For example, the control system 120 can analyze the sensor data 111 to first identify a pick-up location option and determine its availability (436) to either continue the analysis or disregard the option.

If the option is available, the control system 120 can further determine whether the option is likely to be most optimal for the pick-up based on a number of factors. Such factors can include a number of remaining options left in the ranked options set 177, the individual rankings of those remaining options, and/or traffic conditions (439), which may or may not permit a pick-up where, for example, double parking is necessary. For example, the control system 120 can analyze the sensor data 111 to determine whether current traffic is below a certain threshold. This threshold can comprise various factors such as road conditions, whether multiple lanes are available, the type of neighborhood (e.g., commercial or residential), the speed limit, and the number of detected operating vehicles traveling in the same direction as the SDV 100. If the traffic is below the threshold, then the control system 120 can determine that the SDV 100 can be safely stopped on the side of the road and/or double parked without causing disruption. Thus, if none of the location options in the options set 177 is available, and the traffic is below the threshold, the control system 120 can stop the SDV 100 at a current location, or at a location most proximate to the requesting user, to make the pick-up. However, if none of the location options are available and the traffic is above the threshold, then the control system 120 can perform a reserve operation to make the pick-up, as described herein. Such a reserve operation may include stopping in a red zone, double parking, or transmitting an update to the requesting user or backend transport facilitation system 190 indicating that the SDV 100 will loop around to make a second attempt.

In various implementations, the control system 120 can further scan the situational environment to detect the requesting user. If the requesting user is at an actual location that differs from the inputted location (e.g., by ten or twenty meters), then the control system 120 can override the initial rankings and recalculate the cost analysis or probabilities based on the distance of the encountered option to the actual location of the requesting user (437). Thus, the control system 120 can prioritize pick-up location options that are more proximate to the user's actual location, and deprioritize location options that are further away from the user's actual location.

According to some examples, if no location options in the options set 177 are available, the control system 120 can perform an on-the-fly selection process (420) described herein, and/or communicate with the requesting user for assistance in making the selection (440). For example, the control system 120 can generate and transmit a mapping feature for display on the user's device 175 via the designated application 179. The mapping feature can include a map of the immediate surroundings of the requesting user, and can enable the user to select a particular location in which to rendezvous with the SDV 100. In response to a selection, the control system 120 can operate the acceleration, braking, and steering systems of the SDV 100 to meet the user at or nearby the selected location.

Alternatively, the control system 120 can determine, based on the hierarchical selection process, an optimal location in which to rendezvous with the requesting user (445). In various aspects, the optimal location can result from a probability calculation for each of the available detected or encountered options (442). In one example, the control system 120 can dynamically calculate a probability that the SDV 100 will encounter a higher ranked available option as compared to a currently encountered or detected option. If the probability is above a certain threshold (e.g., sixty-five or seventy percent), then the control system 120 can disregard the current option and continue to analyze further detected options. However, if the probability calculate yields a value lower than the threshold, then the control system 120 can stop the SDV 100 at the current location (455). Thus, the control system 120 can pull over the SDV 100 at an optimal pick-up location based on that location corresponding to the first cost probability calculation below the predetermined threshold.

Thereafter, the control system 120 can signal the requesting user to rendezvous with the SDV 100 at the location. In one example, the control system 120 can provide a visual or auditory signal, such as displaying an indication on an outwardly visible display, or sounding a siren or horn of the SDV 100. Additionally or alternatively, the control system 120 can transmit a confirmation to the user's device 175 indicating that the SDV 100 has stopped or will stop at the optimal location option (450). After picking up the requesting user, the control system 120 can autonomously drive the SDV 100 to the destination (460).

Hardware Diagram

Figure 5:
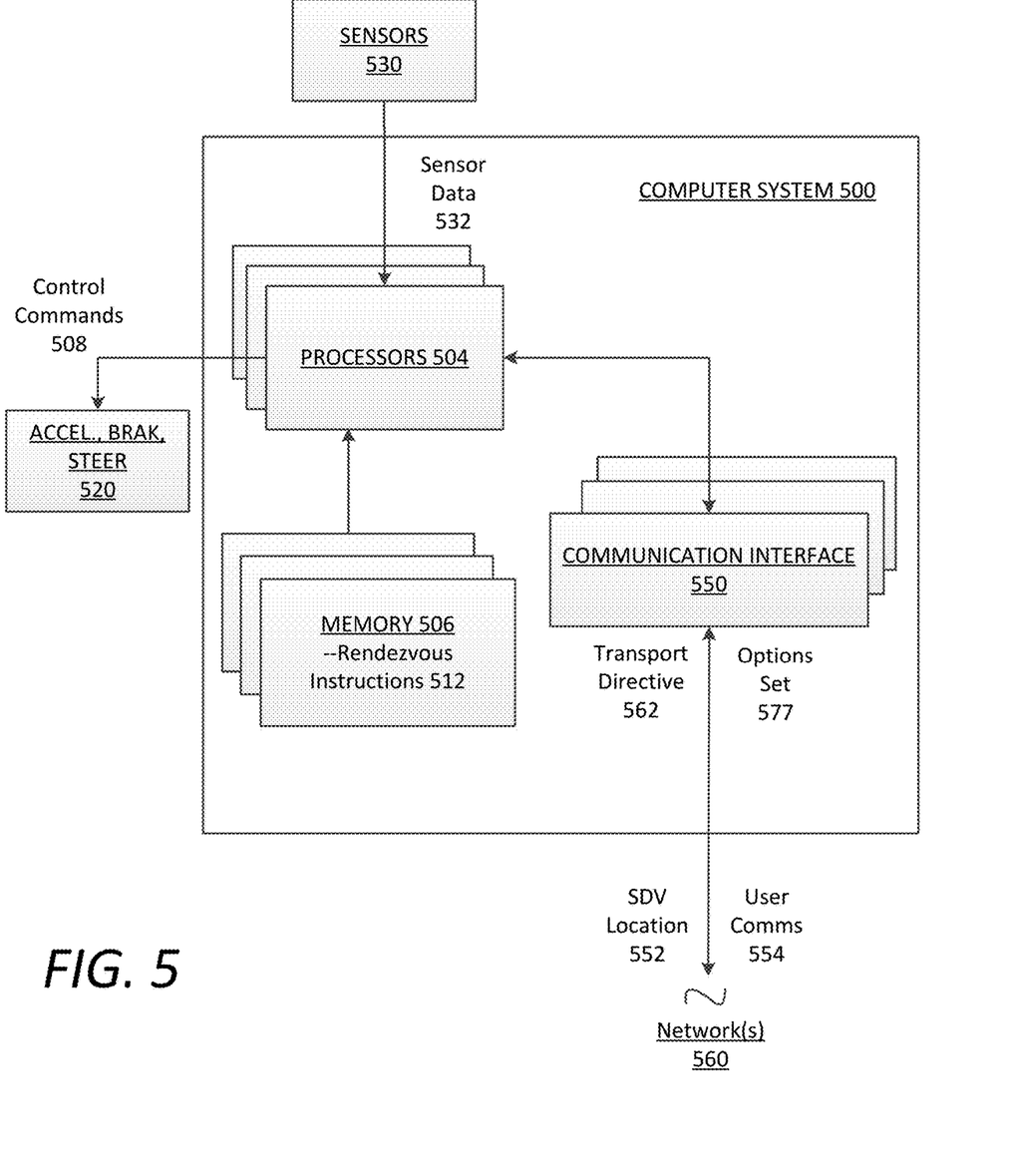
FIG. 5 is a block diagram illustrating a computing system for an SDV upon which examples described herein may be implemented.

FIG. 5 is a block diagram illustrating a computing system for an SDV upon which examples described herein may be implemented. The computer system 500 can be implemented using one or more processors 504, and one or more memory resources 506. In the context of FIG. 1, the control system 120 can implemented using one or more components of the computer system 500 shown in FIG. 5.

According to some examples, the computer system 500 may be implemented within an autonomous vehicle with software and hardware resources such as described with examples of FIG. 1. In an example shown, the computer system 500 can be distributed spatially into various regions of the self-driving vehicle, with various aspects integrated with other components of the self-driving vehicle itself. For example, the processors 504 and/or memory resources 506 can be provided in the trunk of the self-driving vehicle. The various processing resources 504 of the computer system 500 can also execute rendezvous instructions 512 using microprocessors or integrated circuits. In some examples, the rendezvous instructions 512 can be executed by the processing resources 504 or using field-programmable gate arrays (FPGAs).

In an example of FIG. 5, the computer system 500 can include a communication interface 550 that can enable communications over one or more networks 560 with a backend transport facilitation system, such as the transport facilitation system 190 described with respect to FIG. 1. In one implementation, the communication interface 550 can also provide a data bus or other local links to electro-mechanical interfaces of the vehicle, such as wireless or wired links to and from the AV control system 120, and can provide a network link to a transport facilitation system over one or more networks 560. Further still, the communication interface 550 can include a local wireless or wired communication link with a user's mobile computing device.

The memory resources 506 can include, for example, main memory, a read-only memory (ROM), storage device, and cache resources. The main memory of memory resources 506 can include random access memory (RAM) or other dynamic storage device, for storing information and instructions which are executable by the processors 504. The processors 504 can execute instructions for processing information stored with the main memory of the memory resources 506. The main memory 506 can also store temporary variables or other intermediate information which can be used during execution of instructions by one or more of the processors 504. The memory resources 506 can also include ROM or other static storage device for storing static information and instructions for one or more of the processors 504. The memory resources 506 can also include other forms of memory devices and components, such as a magnetic disk or optical disk, for purpose of storing information and instructions for use by one or more of the processors 504.

According to some examples, the memory 506 may store a plurality of software instructions including, for example, rendezvous instructions 512. The rendezvous instructions 512 may be executed by one or more of the processors 504 in order to implement functionality such as described with respect to FIGS. 1 through 4.

In certain examples, the computer system can transmit the SDV location 552 to the backend transport facilitation system. Based on a correlation between an inputted pick-up location in a pick-up request submitted by a user and the SDV location 552, the computer system 500 can receive a transport directive 562 via the communication interface 550 and network 560 from a transport facilitation system. In some aspects, the computer system 500 can further receive an options set 577, corresponding to an inputted pick-up location, from the transport facilitation system. In variations, the computer system 500 can perform a lookup of proximate pick-up location options in a local database based on the inputted pick-up location in the transport directive 562.

In executing the rendezvous instructions 512, as the SDV approaches a pick-up area to pick up the requesting user, the processing resources 504 can analyze sensor data 532 from a number of sensors 530 of the SDV (e.g., LiDAR and/or stereo cameras) to identify each detected option in the options set 577, determine availability for that option, and calculate a cost probability of whether to pull over or continue to search for better options. In one example, execution of the rendezvous instructions can further cause the control system 120 to generate and transmit communications 554 to the requesting user, as described herein. In analyzing an processing the sensor data 532, the processing resources 504 can also generate control commands 508 to operate the acceleration, braking, and steering systems 520 of the SDV in order to autonomously drive the SDV through road traffic and make pick-ups and drop-offs as described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A computer-implemented method for facilitating self-driving vehicle transportation, the method comprising:
    obtaining via a user device, by a computing system, a pick-up request, wherein the pick-up request is indicative of a pick-up location, the pick-up location comprising at least one of a current user location or a desired user location, wherein the current user location is obtained via one or more sensors of the user device;
    determining, by the computing system, a pick-up area based at least in part on the pick-up location, wherein the pick-up area comprises an area encompassing the pick-up location;
    determining, by the computing system, a plurality of pick-up options for the pick-up request based at least in part on the pick-up area;
    selecting from the plurality of pick-up options, by the computing system, a first pick-up option for a self-driving vehicle that is assigned to the pick-up request; and
    communicating, by the computing system to a device associated with the self-driving vehicle, a transport directive to service the pick-up request, the transport directive indicating the first pick-up option for the self-driving vehicle.

2. The computer-implemented method of claim 1, wherein the first pick-up option is selected based at least in part on user input from a user associated with the user device.

3. The computer-implemented method of claim 1, further comprising:
    tracking, by the computing system, a location of the self-driving vehicle; and
    determining, by the computing system, whether the self-driving vehicle utilizes the first pick-up option.

4. The computer-implemented method of claim 3, wherein determining, by the computing system, whether the self-driving vehicle utilizes the first pick-up option comprises:
    determining, by the computing system, that the self-driving vehicle utilizes the first pick-up option based at least in part on the location of the self-driving vehicle.

5. The computer-implemented method of claim 3, wherein determining, by the computing system, whether the self-driving vehicle utilizes the first pick-up option comprises:
    obtaining, by the computing system, a communication sent from the self-driving vehicle indicating that the self-driving vehicle has found the first pick-up option.

6. The computer-implemented method of claim 5, wherein the communication is sent by the self-driving vehicle as the self-driving vehicle approaches the first pick-up option.

7. The computer-implemented method of claim 6, wherein the communication indicates that the self-driving vehicle will utilize or is utilizing the first pick-up option.

8. The computer-implemented method of claim 6, further comprising:
    sending, by the computing system, a communication to the user device associated with the user that is to travel in the self-driving vehicle.

9. The computer-implemented method of claim 8, wherein the communication indicates a location of the first pick-up option and a confirmation to the user device that the self-driving vehicle has found the first pick-up option.

10. The computer-implemented method of claim 8, wherein the communication queries the user as to whether the first pick-up option is proximate to the user.

11. The computer-implemented method of claim 1, further comprising:
    obtaining, by the computing system, at least one of pick-up data or drop-off data associated with at least one of a plurality of self-driving vehicles or human driven vehicles; and
    determining, by the computing system, the plurality of pick-up options based at least in part on at least one of the pick-up data or the drop-off data.

12. A computer-implemented method for self-driving vehicle control comprising:
    obtaining via a remote system, by a communications array of a vehicle computing system of a self-driving vehicle (SDV), a transport directive to service a pick-up request, the transport directive indicating a pick-up location associated with the pick-up request;

obtaining, by the vehicle computing system via one or more sensors, location data indicative of a vehicle location of the SDV;

controlling, by the vehicle computing system based at least in part on the vehicle location, the SDV to travel to a pick-up area that encompasses the pick-up location associated with the pick-up request;

obtaining, by the vehicle computing system via the one or more sensors, sensor data indicative of an environment of the SDV within the pick-up area that encompasses the pick-up location associated with the pick-up request; and determining, by the computing system, an optimal pick-up location for the pick-up request within the pick-up area based at least in part on the sensor data.

13. The computer-implemented method of claim 12, further comprising:
communicating, by the vehicle computing system, data indicative of the optimal pick-up location to a user device of a user associated with the pick-up request.

14. The computer-implemented method of claim 12, wherein the optimal pick-up location is determined based on at least one of an actual distance to a user associated with the pick-up request or distance to the pick-up location indicated in the transport directive.

15. The computer-implemented method of claim 12, wherein the optimal pick-up location is determined based at least in part on at least one of: a traffic condition or one or more available pick-up areas.

16. The computer-implemented method of claim 12, wherein the optimal pick-up location is determined based at least in part on user input of a user associated with the pick-up request.

17. The computer-implemented method of claim 12, further comprising:
identifying, by the vehicle computing system; a user associated with the pick-up request within the surrounding environment of the SDV.

18. The computer-implemented method of claim 12, further comprising:
obtaining, by the vehicle computing system, user input data indicative of a drop-off location; and
controlling, by the vehicle computing system, the SDV to travel to the drop-off location.

19. A computing system comprising one or more processors that execute instructions to cause the computing system to perform in operations comprising:
obtaining, via a user device, a pick-up request that is indicative of a pick-up location, the pick-up location comprising at least one of a current user location or a desired user location, wherein the current user location is obtained via one or more sensors of the user device;
determining a pick-up area based at least in part on the pick-up location, wherein the pick-up area comprises an area encompassing the pick-up location;
determining a plurality of pick-up options for the pick-up request based at least in part on the pick-up area;
determining a first pick-up option for a self-driving vehicle that is assigned to the pick-up request; and
communicating, to a device associated with the self-driving vehicle, a transport directive to service the pick-up request, the transport directive indicating the first pick-up option for the self-driving vehicle.

20. The computing system of claim 1, wherein determining the plurality of pick-up options for the pick-up request based at least in part on the pick-up area comprises:
determining a radial distance from the pick-up location;
determining the plurality of pick-up options for the pick-up request based at least in part on the radial distance so that each of the plurality of pick-up options is within the radial distance; and
communicating the plurality of pick-up options to the self-driving vehicle, wherein the first pick-up option is determined based at least in part on information from the self-driving vehicle.

* * * * *